United States Patent
Wenzel et al.

(10) Patent No.: US 10,015,250 B2
(45) Date of Patent: Jul. 3, 2018

(54) IMAGE CONTENT BASED PREDICTION AND IMAGE CACHE CONTROLLER

(75) Inventors: Fabian Wenzel, Hamburg (DE); Thomas Netsch, Hamburg (DE); Sebastian Peter Michael Dries, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 866 days.

(21) Appl. No.: 13/882,601

(22) PCT Filed: Oct. 27, 2011

(86) PCT No.: PCT/IB2011/054797
§ 371 (c)(1),
(2), (4) Date: Apr. 30, 2013

(87) PCT Pub. No.: WO2012/059851
PCT Pub. Date: May 10, 2012

(65) Prior Publication Data
US 2013/0227052 A1    Aug. 29, 2013

(30) Foreign Application Priority Data
Nov. 5, 2010 (EP) .................................. 10190111

(51) Int. Cl.
G06F 15/167 (2006.01)
H04L 29/08 (2006.01)
G06T 19/00 (2011.01)

(52) U.S. Cl.
CPC ........ *H04L 67/1097* (2013.01); *G06T 19/003* (2013.01)

(58) Field of Classification Search
USPC ................. 709/213, 202, 203, 219
See application file for complete search history.

(56) References Cited

U.S. PATENT DOCUMENTS

| 6,442,651 B2 | 8/2002 | Crow |
| 6,891,546 B1 * | 5/2005 | Park et al. ............. 345/552 |

(Continued)

FOREIGN PATENT DOCUMENTS

| CN | 101147174 A | 3/2008 |
| JP | 2006101329 A | 4/2006 |

(Continued)

OTHER PUBLICATIONS

Cevikbas, Safak Burak et al "Prefetching Optimization for Distributed Urban Environments", International Conference on Cyberworlds 2008 IEEE, pp. 291-297.

(Continued)

*Primary Examiner* — Lan-Dai T Truong (57) ABSTRACT

Cache controller (120) for use in a system (180) comprising an image client (100) and an image server (140), the image client enabling a user to navigate through image data having at least three spatial dimensions by displaying views of the image data that are obtained from the image server in dependence on navigation requests of the user, and the cache controller comprising a processor (122) configured for obtaining content data indicative of a content shown in a current view of the image client (100), the current view representing a first viewpoint in the three spatial dimensions of the image data, the processor being further configured for predicting a view request of the image client in dependence on the content data, the view request corresponding to a view representing a second viewpoint in the three spatial dimensions of the image data, and a communication means (124) for obtaining the view from the image server in dependence on the view request, and for caching the view in a cache (130).

20 Claims, 4 Drawing Sheets

(56) References Cited

U.S. PATENT DOCUMENTS

| | | | |
|---|---|---|---|
| 7,420,575 B2* | 9/2008 | Matsumoto | G06F 19/321 345/619 |
| 9,111,223 B2 | 8/2015 | Schmidt et al. | |
| 2002/0078300 A1 | 6/2002 | Dharap | |
| 2005/0047634 A1 | 3/2005 | Schmidt | |
| 2006/0007244 A1 | 1/2006 | Matsumoto | |
| 2008/0267471 A1* | 10/2008 | Yu | G06K 9/4604 382/128 |
| 2011/0106221 A1* | 5/2011 | Neal, II | C12N 13/00 607/74 |
| 2011/0148932 A1* | 6/2011 | Niemi | G06F 17/30274 345/660 |
| 2012/0155734 A1* | 6/2012 | Barratt et al. | 382/131 |
| 2013/0014064 A1* | 1/2013 | Zhu | G06F 15/16 715/850 |

FOREIGN PATENT DOCUMENTS

| | | |
|---|---|---|
| RU | 2364924 A | 4/2006 |
| WO | 2010084435 A2 | 7/2010 |

OTHER PUBLICATIONS

Chen, Jerry et al "Interactive, Internet Delivery of Visualization via Structured Prerendered Multiresolution Imagery", IEEE Transactions on Visualization and Computer Graphics, vol. 14, No. 2, Mar. 2008, pp. 302-312.

Mavlankar, Aditya et al "Pre-Fetching Based on Video Analysis for Interactive Region-of-Interest Streaming of Soccer Sequences", International Conference on Image Processing (ICIP), 2009, pp. 3061-3064.

Doshi, Punit R. "Adaptive Prefetching for Visual Data Exploration", A Thesis Submitted to Worcester Polytechnic Institute, Jan. 2003.

Zhang, Chong "OptiStore: An On-Demand Data Processing Middleware for Very Large Scale Interactive Visualization", Thesis Submitted to University of Illinois, Chicago, 2007.

Klemm, Reinhard P. "WebCompanion: A Friendly Client-Side Web Prefetching Agent", IEEE Transactions on Knowledge and Data Engineering, vol. 11, No. 4, Jul. 1999.

* cited by examiner

IMAGE CONTENT BASED PREDICTION AND IMAGE CACHE CONTROLLER

FIELD OF THE INVENTION

The invention relates to a cache controller, and a method of caching, for use in a system comprising an image client, an image server and a cache. The invention further relates to an image client and an image server comprising the cache controller.

In the technical field of imaging, an image apparatus may allow a user to navigate through image data in three spatial dimensions, such as the three spatial dimensions of volumetric image data or those formed by a stack of two-dimensional images. The image apparatus may, for example, allow a user to navigate through a three-dimensional reconstruction of a body structure by displaying two-dimensional cross-sections of the three-dimensional reconstruction in dependence on navigation commands issued by the user.

BACKGROUND OF THE INVENTION

An image apparatus may not actually comprise all of the image data. Instead, the image apparatus may be an image client that only obtains certain views of the image data from an image server. The image client and the image server may together form a system that allows the user to navigate through the image data by obtaining the views from the image server in dependence on navigation requests of the user, and displaying the views on the image client. During use, the obtained views of the image data constitute less data than all of the image data. Therefore, the system may enable an image client to navigate through the image data, without a need for the image client to obtain or locally store all of the image data.

The above system, however, may suffer from a latency, i.e. a delay, between a user requesting a view and the image client being able to display the view. In particular, the latency may occur during the period of obtaining the view from the image server.

A PhD thesis entitled "*OptiStore: An On-Demand Data Processing Middleware for Very Large Scale Interactive Visualization*" by Chong Zhang, submitted to the University of Illinois at Chicago, 2007, discloses a client that runs a visualization application and is connected to a data repository comprising a three-dimensional image data set. The client is arranged for minimizing a data access latency of the visualization application to the data set. For that purpose, a main controller receives view information and data requests from the visualization application. The view information relates to, e.g., a position of a viewpoint. The main controller then checks whether the requested data exists in a cache. If it exists, the cache returns the data to the visualization application; otherwise, it passes the view information to a predictor. Based on a history of the view information, the predictor creates a data request. Finally, once the requested data arrives from the data repository, it is stored in the cache. Hence, the main controller reduces the latency of the visualization application by predicting future data requests from a history of the view information.

A problem of the main controller is that it insufficiently reduces a latency that occurs while navigation through image data on an image client takes place.

SUMMARY OF THE INVENTION

It would be advantageous to have an apparatus for, or method of, further reducing a latency that occurs while navigation through image data on an image client takes place.

To better address this concern, a first aspect of the invention provides a cache controller for use in a system comprising an image client and an image server, the image client enabling a user to navigate through image data having at least three spatial dimensions by displaying views of the image data that are obtained from the image server in dependence on navigation requests of the user, and the cache controller comprising a processor configured for obtaining content data indicative of a content shown in a current view of the image client, the current view representing a first viewpoint in the three spatial dimensions of the image data, the processor being further configured for predicting a view request of the image client in dependence on the content data, the view request corresponding to a view representing a second viewpoint in the three spatial dimensions of the image data, and a communication means for obtaining the view from the image server in dependence on the view request, and for caching the view in a cache.

The above cache controller is part of an image client/server system. The image server locally stores image data that has at least three dimensions that are spatial dimensions. The image client is arranged for displaying a current view of the image data, i.e., a visualization or visual representation of a part of the image data that is currently shown to the user. The current view corresponds to a viewpoint within the three spatial dimensions that shows the part of the image data from within or from outside the image data. The image client allows a user to interactively navigate through the image data by fetching, i.e., retrieving, views from the image server that are associated with navigation instructions provided by the user. The user can therefore navigate through the three spatial dimensions of the image data. Furthermore, the system comprises a cache configured for caching a view obtained from the image server.

The cache controller comprises a processor that is configured for predicting a future view request of the image client. The processor therefore effectively predicts a future navigation action of the user, as the future view request is typically a direct consequence of, and thus directly associated with, a future navigation action of the user. The prediction is based on data that is indicative of a content of the current view, i.e., something contained within the current view. The view that corresponds to the future view request corresponds to another viewpoint, i.e., showing another part of the image data. Hence, the future view request reflects a prediction of the user changing viewpoint. The cache controller further comprises a communication means that obtains the view from the image server. The communication means is able to instruct the cache to cache the view in its cache memory. Thus, when the image client actually requests the view, the image server does not need to provide the view anymore. Instead, the view is obtained directly from the cache.

The above measures have the effect that the content of the current view is used to predict a view request of the image client, and that the view associated with the view request is cached in a cache for enabling the image client to later on directly obtain the view from the cache. The view request is predicted by the cache controller in dependence on the content of the current view. The content of the current view typically has a relatively significant influence on how the user navigates further through the image data. Therefore, the cache controller predicts how the user navigates through the image data by basing the prediction on content data that is indicative of the content that the user is currently viewing. This yields a relatively accurate prediction. A relatively accurate prediction has the effect that it is relatively likely that the cache controller has correctly predicted a future view request of the image client. Thus, the cache controller offers an improved prediction of view requests for obtaining a relatively low latency. Advantageously, the cache controller offers an improved navigation experience to the user. Advantageously, the cache controller may use the content data to specifically cache views that may be of particular relevance to the user.

The invention is partially based on the recognition that the number of possible navigation requests a user may provide is proportional to the dimensionality of the image data through which the user is navigating, since the dimensionality determines the degree of freedom that the user has in navigating. Consequently, it is more difficult to correctly predict a future navigation request in the case that the image data has three spatial dimensions than when the image data only has two spatial dimensions. Moreover, it is more difficult to correctly predict a future navigation request in the case that the image data has three spatial dimensions than when the image data has two spatial dimensions and one temporal dimension, i.e., the image data being a normal sequence of video frames. Predicting a future view request within the sequence of video frames may involve temporally tracking an object that the user is following, which is known and relatively easy. It is recognized, however, that the content of the current view is typically indicative of how the user navigates through the image data, irrespective of the spatial dimensionality of the image data. For example, if the current view shows a vertebra, it may be relatively likely that the user navigates to an adjacent vertebra. Hence, the content of the current view enables an accurate prediction of future view requests.

Optionally, the processor is configured for obtaining the content data by performing an image analysis of the current view. A user will, often unconsciously, analyze the current view to determine how to navigate further through the image data. The image analysis allows the cache controller to analyze the content of the current view in a relatively similar manner. The cache controller thus bases its prediction on relatively similar information as is used by the user in determining how to navigate further. Advantageously, the prediction of the view request is improved, and as a result, a lower latency is obtained.

Optionally, the processor is configured for performing the image analysis for obtaining an object within the current view and predicting the view request in dependence on the object. The current view may comprise an object. In this case, the user may use the object in determining how to navigate further through the image data, for example, by recognizing the object and using it as a reference point. By using the image analysis to obtain the object and by predicting the view request in dependence on the object, the cache controller bases its prediction on relatively similar information as is used by the user to determine how to navigate further. Advantageously, the prediction of the view request is improved, and as a result, a lower latency is obtained.

Optionally, the processor is configured for predicting the view request by obtaining an orientation of the object within the current view, and predicting a request associated with an adjacent view, adjacent to the current view along the orientation of the object, for predicting the view request.

The orientation of the object may be of particular relevance for the user in determining how to navigate further through the image data. In particular, the user may use the orientation of the object to navigate to an adjacent part of the image data. By obtaining the orientation of the object from the current view, the cache controller bases its prediction on relatively similar information as is used by the user to determine how to navigate further. More specifically, the orientation is used to predict a view request that corresponds to an adjacent part of the image data, and the associated view is cached. Advantageously, the prediction of the view request is improved, and as a result, a lower latency is obtained.

Optionally, the processor is configured for obtaining metadata comprising the content data from the image server. The cache controller can obtain the content data in a relatively efficient manner by obtaining metadata from the image server and obtaining the content data from the metadata. Advantageously, the current view does not need to be obtained by the cache controller. Advantageously, no image analysis of the current view is needed. Advantageously, the metadata allows the cache controller to obtain specific, e.g., manually optimized, content data that enables an improved prediction.

Optionally, the processor is configured for obtaining metadata indicative of image content of the image data from the image server, the image content comprising the content, and the processor being configured for obtaining the content data from the metadata by obtaining position data indicative of a position of the first viewpoint in the three spatial dimensions of the image data, and selecting a portion of the metadata in dependence on the position data for obtaining as the content data the portion of the metadata being indicative of the content.

The cache controller obtains the content data from metadata that is indicative of image content of the image data. Since the image content comprises the content, the processor can obtain the content data by selecting a particular portion of the metadata that is indicative of the content. For selecting the portion, the processor obtains position data indicative of a position of the first viewpoint in the three spatial dimensions of the image data. The first viewpoint shows the content, and thus relates to its position within the image data. This allows the processor to determine which portion of the metadata to select. Advantageously, the metadata does not need to be adapted to a change in the current view. Advantageously, the cache controller does not need to obtain all of the current view, but only its position within the image data.

Optionally, the processor is configured for obtaining user history data indicative of previous use of the image client, and the processor is configured for predicting the view request in dependence on the content data and on the user history data.

The user may, when viewing the current view, navigate further through the image data in a similar way as done previously by the user or other users. By obtaining user history data indicative of previous use of the image client, the cache controller can predict the view request in dependence on the content of the current view and on the user history data. Thus, the cache controller can base its prediction on how the user, or other users, previously reacted to the content shown in the current view. Advantageously, the prediction of the view request is improved, and as a result, a lower latency.

An image client may comprise the cache controller set forth.

An image server may comprise the cache controller set forth. Advantageously, the cache controller has access to all of the image data located on the image server.

Optionally, the processor is configured for obtaining the content data by performing an image analysis of the image data. A user may be relatively familiar with the content of the image data or have an expectancy of the content of the image data. This may influence how the user navigates through the image data. The image analysis allows the cache controller to analyze the content of the image data. This enables the cache controller to base its prediction on relatively similar information as is used by the user in determining how to navigate further. Advantageously, the prediction of the view request is improved, and as a result, a lower latency is obtained.

Optionally, the image server is used with an image client comprising the cache, and the communication means is configured for caching the view in the cache of the image client. Therefore, the cache is located in the image client, the cache controller is located in the image server, and the communication means of the cache controller is configured for caching the view in the cache of the image client. Advantageously, the image client has relatively fast access to the cache while the cache controller in the image server has access to all of the image data located on the image server. Advantageously, the cache and the cache controller are both located at an optimal location within the system.

A workstation may comprise the cache controller set forth.

An imaging apparatus may comprise the cache controller set forth.

A method of caching, for use in a system comprising an image client and an image server, the image client enabling a user to navigate through image data having at least three spatial dimensions by displaying views of the image data that are obtained from the image server in dependence on navigation requests of the user, and said method comprising obtaining content data indicative of a content shown in a current view of the image client, the current view representing a first viewpoint in the three spatial dimensions of the image data, predicting a view request of the image client in dependence on the content data, the view request corresponding to a view representing a second viewpoint in the three spatial dimensions of the image data, and obtaining the view from the image server in dependence on the view request, and caching the view in a cache.

A computer program product may comprise instructions for causing a processor system to perform the method set forth.

Optionally, the image client comprises the cache. By having the cache inside the image client, the image client has relatively fast access to the cache. Advantageously, if the image client is connected to the image server through a relatively low bandwidth connection, the cache enables the image client to avoid or reduce the latency associated with the relatively low bandwidth connection.

It will be appreciated by those skilled in the art that two or more of the above-mentioned embodiments, implementations, and/or aspects of the invention may be combined in any way deemed useful.

Modifications and variations of the image client, image server or image acquisition apparatus, the workstation, the method, and/or the computer program product, which correspond to the described modifications and variations of the cache controller, can be carried out by a person skilled in the art on the basis of the present description.

A person skilled in the art will appreciate that the method may be applied to multi-dimensional image data, e.g. three-dimensional (3-D) or four-dimensional (4-D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

The invention is defined in the independent claims. Advantageous embodiments are defined in the dependent claims.

BRIEF DESCRIPTION OF THE DRAWINGS

These and other aspects of the invention are apparent from and will be elucidated with reference to the embodiments described hereinafter. In the drawings.

DETAILED DESCRIPTION OF EMBODIMENTS

It is noted that, hereinbefore and hereinafter, image data refers to a data representation of an image. The image is a visual representation of information. The image data typically comprises data elements such as luminance or chrominance values of portions of the image. Alternatively, the data elements may be other values that may be interpreted and thus visualized as luminance or chrominance values. The portions of the image may be represented by pixels. It will be appreciated that any suitable data representation may be used as known from, e.g., the technical fields of image processing or image coding.

The content of the current view or image data refers to subject matter that is contained within the current view or image data, respectively. The content may refer to relatively high-level subject matter, such as an object depicted in the current view. Similarly, the content may relate to a semantic interpretation of the object, e.g., what kind of object is contained within the current view. The content may also refer to relatively low-level subject matter within the current view, such as the luminance values of a group of pixels.

The content data is a data representation of the content. The content may be represented in the form of text, numbers or any other suitable format. In a specific example, if the content is an object within the image data, the content data may comprise a data element identifying the object and a further data element identifying its location within the three spatial dimensions of the image data. In another specific example, if the content is associated with a region of particular interest within the current view, the content data may identify its location within the current view. It will be appreciated that many data representations exist, as are known from, e.g., the technical field of image analysis.

Figure 1:
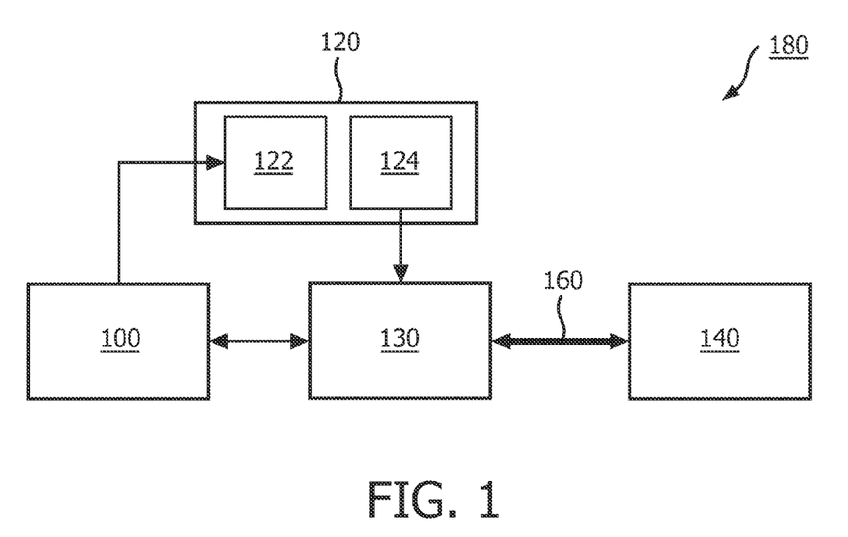
FIG. 1 shows an image client, an image server, a cache and a cache controller.

FIG. 1 shows a system 180 comprising an image client 100 and an image server 140. The image client 100 is connected to a cache controller 120 for providing content data to a processor 122 of the cache controller 120. The image client 100 is further connected to the image server 140 via a cache 130 for obtaining views from the image server 140, and for requesting views from the image server 140. The cache 130 is connected to the image server 140 via a data connection 160. The cache 130 is therefore part of a connection between the image client 100 and the image server 140, i.e., the cache 130 is located in between both. The cache controller 120 further comprises a communication means 124 for obtaining a view from the image server 140 in dependence on a view request that is generated by the processor 122. Similarly to the image client 100, the communication means 124 is also shown to be connected to the image server via the cache 130.

The cache 130 shown in FIG. 1 may be a transparent cache. This means that the image client 100 and image server 140 need to be adapted or made aware of the presence of the cache 130 in between them. For that purpose, the cache 130 typically passes on data between the image client 100 and the image server 140. However, the cache 130 can also cache views. Thus, if the image client 100 provides a view request that is associated with a view stored in the cache 130, the cache 130 directly provides the view to the image client 100 instead of passing on the view request to the image server 140. As such, the cache can cache views without a need for adapting the image client 100 or the image server 140.

During operation, a user may use the image client 100 to navigate through the image data that is located on the image server 140. For that purpose, the image client 100 displays views of the image data that are obtained from the image server 140 in dependence on navigation requests of the user. The image client 100 may obtain the views by generating view requests in dependence on the navigation requests. The view requests are transmitted, via the cache 130, to the image server 140. In response thereto, the image server 140 transmits the requested views, via the cache 130, to the image client 100.

The image client 100 may show a view to the user, i.e., a current view 200. The current view 200 shows a part of the content of the image data. In the particular example shown in FIG. 2, the image data is medical image data obtained by Angiography, and its content relates to an arrangement of blood vessels within a human patient. The current view 200 shows a two-dimensional slice of the medical image data comprising a particular blood vessel 250. It is likely that the user decides to further navigate through the image, based on the content of the image data. For example, the user may decide that, based on the blood vessel 250 shown in the current view 200, a view of the blood vessel further upstream, i.e., to the right, is of particular interest. Hence, he may issue a navigation command in the future to navigate further upstream along the blood vessel, e.g., by issuing pan or scroll commands.

Figure 2:
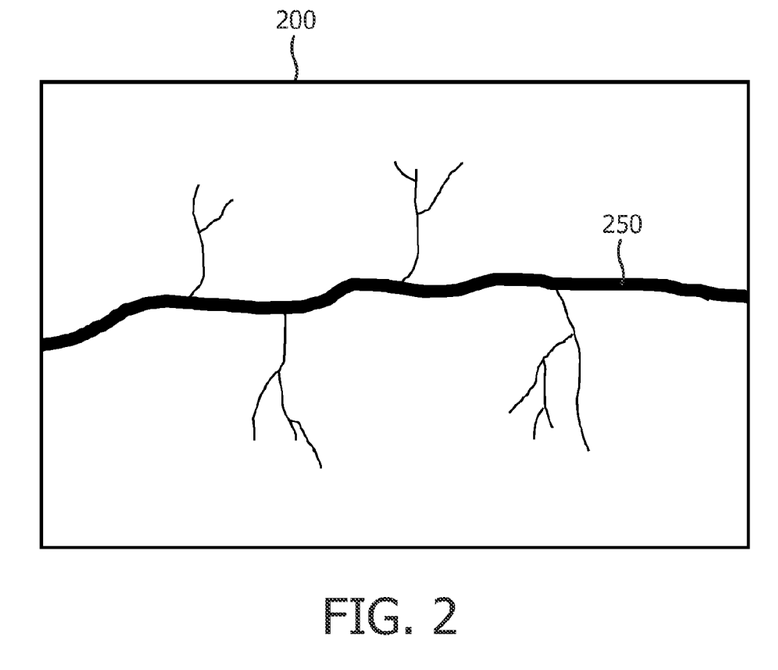
FIG. 2 shows a current view of the image client comprising an object.

The processor 122 of the cache controller 120 is configured for obtaining content data that relates to the content of the current view 200. For that purpose, the processor 122 receives the current view 200, and performs an image analysis of the current view 200. The image analysis may be arranged for detecting an object shown in the current view, for example, the blood vessel 250, by means of a segmentation algorithm. The image analysis may also provide an orientation of the blood vessel, e.g., a direction along which the blood vessel runs. The orientation may be, e.g., an equation of a line that substantially coincides with the blood vessel.

Figure 3:
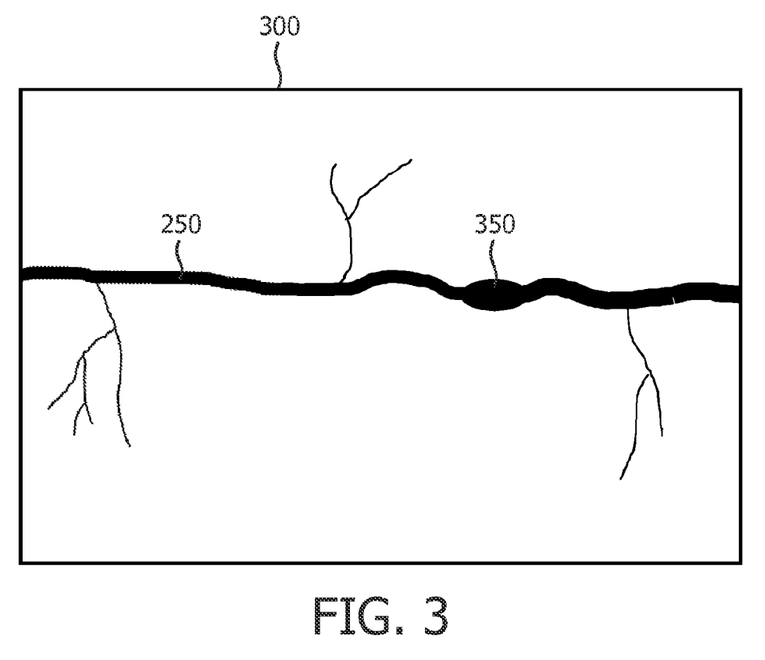
FIG. 3 shows a view corresponding to a predicted view request.

The processor 122 may, based on the orientation, predict a view request that is associated with an adjacent view 300, as shown in FIG. 3. Here, a portion of the blood vessel 250 is shown that is located further upstream, with the portion comprising a blood clot 350. For predicting the view request, the processor 122 may obtain a position of the current view within the image data, i.e., being indicative of how the viewpoint represented by the current view is oriented with respect to the image data. Based on the current position and the orientation of the object within the current view, an adjacent location may be determined. The processor 122 may then generate a view request that is associated with the adjacent location. Obtaining the current position may, for example, comprise obtaining position data from the image server 140. The image server 140 may provide the current position by providing position data indicative of a last requested view. In a specific example, the image server 140 may provide views comprising metadata indicative of their position. Hence, the processor 122 may obtain the current position from the current view.

The communication means 124 may transmit the view request through the cache 130 to the image server 140. Once the image server 140 provides the view associated with the view request, the communication means 124 may instruct the cache to cache the view in its cache memory. Alternatively, the cache 130 itself may be arranged for automatically caching views that are provided by the image server 140, i.e., without a need for the communication means 124 to explicitly instruct the cache 130. Consequently, when the user actually provides the navigation command to navigate further upstream along the blood vessel, the image client 100 may obtain the view directly from the cache 130.

Figure 4:
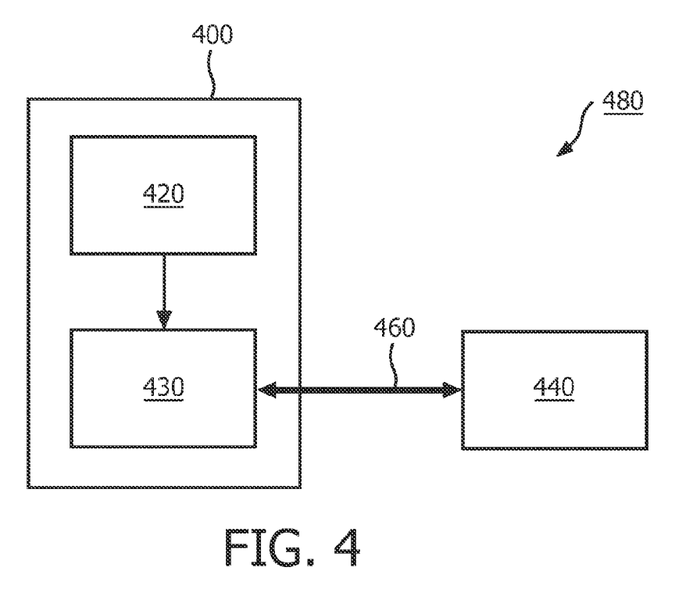
FIG. 4 shows an image client comprising a cache and a cache controller.

FIG. 4 shows a system 480 in which the cache controller 420 and the cache 430 are part of the image client 400 instead of being external components. Functionally, however, the system is substantially identical to the system 180 shown in FIG. 1, with only this difference that the communication between the cache controller 420, the cache 430 and the image client 400 now is internal communication within the image client 400. The image client 400 communicates with the image server 440 via an external data connection 460. Furthermore, in such a system 400, the cache 430 may be a part of a storage means that is also used for storage of other data. Hence, the system may not need to have a separate cache component.

Figure 5:
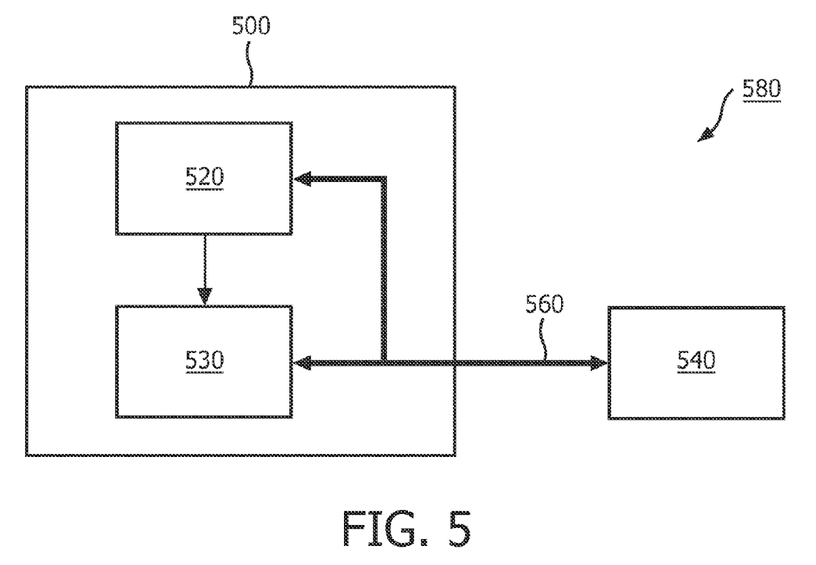
FIG. 5 shows the cache controller receiving metadata from an image server.

FIG. 5 shows a system 580 in which the cache controller 520 within the image client 500 is configured for obtaining metadata that is indicative of the content from the image server 540. The cache controller 520 may obtain the metadata via a same data connection 560 as is used to transmit the views and view requests. The metadata may be obtained from an image analysis of the image data, and as a result, may identify an object located within the image data and its orientation. Therefore, the cache controller 520 may use, e.g., the location or the orientation of the object, e.g., a blood vessel 250, to predict a view that the user may request in the future. The cache controller may also use the location of a detected nearby object, e.g., a blood clot 350, to predict the view. The blood clot does not need to be visible in the current view, as its location can be obtained from the metadata. The metadata may also be manually generated. For example, a specialist may manually generate metadata that is associated with particularly relevant portions of the image data. Consequently, the cache controller 520 may predict view requests that are associated with the relevant portions of the image data, and store the predicted views in the cache 530 of the image client 500.

Figure 6:
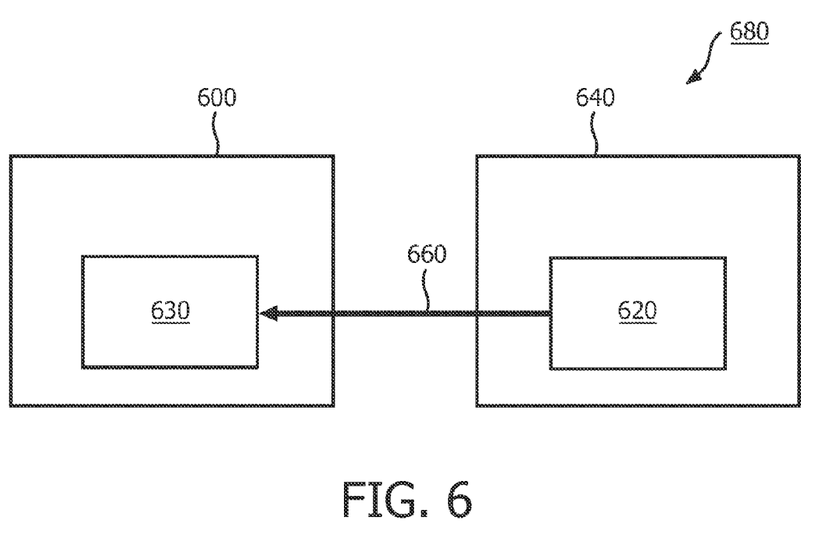
FIG. 6 shows an image client comprising a cache and an image server comprising a cache controller.

FIG. 6 shows a system 680 in which the image client 600 comprises the cache 630, and the image server 640 comprises the cache controller 620. This may allow the cache controller 620 to access all of the image data on the image server 640. Similarly to the cache controller 120 shown in FIG. 1, the cache controller 620 is configured for obtaining content data by performing an image analysis. However, instead of performing an image analysis of the current view 200, the cache controller 620 performs an image analysis of the image data. For example, the image analysis may be arranged for detecting an object shown in the image data, for example, a vertebra, by means of a segmentation algorithm. The image analysis may also provide an orientation of the vertebra. The orientation may be, e.g., an equation of plane within the image data that substantially coincides with the vertebra. The cache controller 620 may use the equation of the plane to determine a location of an adjacent vertebra, and predict a view request that is associated with an adjacent view that shows the adjacent vertebra. Furthermore, the cache controller 620 may request the view internally within the image server 640, and transmit the view to the cache 630 that is located in the image client.

In general, it will be appreciated that the content data may take various forms. For example, the content data may be a line or plane equation of an object that is located within the image data. The content data may also relate to a particular object in general, e.g., by indicating a presence or approximate location of the object within the image data. The content data may also indicate a plurality of objects, and a logical connection between the objects. In a specific example, the content data may indicate a location of multiple vertebras shown in the image data, and indicate the relative location of the vertebras in a spinal column. Hence, if the user is currently viewing a vertebra, the cache controller may cache a view of an adjacent vertebra. Similarly, if the user is currently viewing a lung nodule, the cache controller may cache views of lymphatic glands, etc. In another specific example, an oncological application may allow a user to view a current view of a three-dimensional thorax scan that includes a nodule, and the image server may use image analysis to automatically detect all nodules in the three-dimensional thorax scan for allowing the cache controller to request views of adjacent nodules, or, in general, lesions, or views of characteristic orientations of the current lesion, e.g., a view showing the largest diameter. In general, the content data may also be semantic content data, obtained from, e.g., a semantic image analysis or from automatically or manually generated metadata. Hence, the content of the current view is associated with a meaning. This allows the cache controller to cache views of the image data that have a semantic relation to, e.g., the content of the current view.

The view request may be predicted in various ways. For example, the processor may use geometrical extrapolation of an orientation of an object that is partially shown in the current view to determine in which adjacent views other parts of the object will be visible. Also, the processor may use previously obtained statistics that indicate how the content of the image data affects a navigation behavior of the user. For example, if the current view displays a vertebra, and it is known from the previously obtained statistics that the user tends to switch between axial and coronal view for that vertebra, the processor may predict view requests of coronal and axial views of adjacent vertebrae. Similarly, the statistics may indicate whether the user has previously switched between axial and coronal view for that vertebra, and thus the view requests may be predicted accordingly. The statistics may be obtained from user history data. The processor may also use a rule-based system that contains rules associating content data with a view request. Hence, the processor may predict the view by matching a rule in a list of rules with content data of the current view, and executing the rule to obtain the view request. Similarly, the processor may use a look-up table or similar data structure to look up a pre-defined view request associated with the content data of the current view.

Of course, in addition to predicting the view request, the cache controller may also predict additional view requests that correspond to additional views. Hence, the view request and its corresponding view may each be part of a set of view requests and corresponding views. For example, when using the image client for navigating through a brain image, the cache controller may predict a set of view requests that correspond to adjacent views that are optimized for mid-sagittal viewing, hippocampal viewing, and ventricle viewing.

A publication "*Pre-fetching based on video analysis for interactive region-of-interest streaming of soccer sequences*" by Mavlankar et al., International Conference on Image Processing (ICIP), 2009, pp. 3061-3064, describes using temporal tracking of a soccer ball or players to predict a movement of a region of interest, and to pre-fetch future region-of-interest pixels accordingly. However, it will be appreciated that temporal tracking is not available within the three spatial dimensions of image data, and thus cannot be used for predicting view requests when a user is navigating through the three spatial dimensions.

The view may be obtained from the image server in various ways. The communication means may directly obtain the view from the image server, and store the view in the cache. The communication means may also provide the view request to the image server via the cache, and the cache may be configured for automatically caching a view that is provided as a result of the view request. Hence, the cache controller may not need to directly receive the view, or in general, be directly connected to the image server.

The image analysis for obtaining the content data may be any suitable image analysis as is known from the technical field of image analysis. For example, the image analysis may comprise a segmentation algorithm for segmenting, and thus obtaining, an object within the image data or within the current view. The segmentation algorithm may be any known segmentation algorithm, e.g., based on edge detection, region growing, clustering, watershed transformation, model based segmentation, etc. Also, for determining the orientation of the object, any known technique may be used. For example, a Hough transform may be used to identify a line or an ellipse within the current view that is associated with an edge of the object. The orientation of the object may be obtained from an orientation of the line, or, e.g., an orientation of a semi-major axis of the ellipse. The image analysis may also be a semantic image analysis algorithm, e.g., using a learning-based approach from the technical field of pattern recognition, for obtaining semantic content data of the current view or of the image data. Therefore, the image analysis can attribute a meaning or interpretation to a segmented or detected object.

The cache controller may be located in either the image client or the image server. If it is located in the image client, the cache controller thus requests views from the image server, and the image server provides, in response thereto, the associated views. Such a mechanism is therefore a form of so-termed 'Pull-technology', as is known from the technical field of network communication. If it is located in the image server, the cache controller internally requests views from within the image server, and the image server provides, in response thereto, the associated views to a cache of the image client, without the image client itself requesting the views. Such a mechanism is therefore a form of so-termed 'Push-technology', as is also known from the technical field of network communication. This may be particularly useful for allowing the cache controller 620 to have access to all of the image data. Also, the image server 640 typically has more computing resources available. This may allow the cache controller 620, for example, to perform a more elaborate image analysis. Of course, the cache controller may also be used as a separate component that is neither part of the image client nor of the image server.

The cache may be located in either the image client or the image server. An image client comprising the cache is useful for reducing a latency associated with the transfer of views between the image client and the image server. Such a latency may be caused by, e.g., the data connection having a low bandwidth, or an inherently high latency associated with other aspects of the data connection. Thus, predicted views may be transmitted from the image server to the image client as soon as possible, e.g., in the background so that the user does not notice this. An image server comprising the cache is useful for reducing a latency associated with generating a view. It may be computationally complex to generate a view from the image data. Hence, the cache controller may be used to already generate the predicted views when the image server is relatively idle, and then cache the generated views in the cache. Hence, when the image client requests the view, the view does not have to be generated anymore. Of course, the cache may also be used as a separate component that is neither part of the image client nor of the image server. For example, the cache may form a part of the data connection between the image client and the image server.

The image client is configured for enabling the user to navigate through the image data. For that purpose, the image client may further comprise (not shown): a processor, storage means, or a communications port. The processor may be arranged for executing instructions that are part of an image client application. The image client application may be a web-based application. The web-based application may also implement the cache controller. The storage means may comprise RAM, ROM, hard disk, removable media such as CD and DVD. The storage means may be used for storing the computer instructions. The storage means may also be used as the cache, i.e., for caching views. The communications port may be used for communication with another computer system, for example the image server. The communications port may be used to establish a data connection with the image server through a local area network, wide area network or the Internet.

Although not shown, the image client may further comprise a display means for displaying the views of the image data. The display means may be any suitable display means, such as, for example, a computer monitor. Alternatively, the image client may comprise a display output for providing the views to a display means that is not part of the image client. The display output may be a computer monitor output. The image client may be configured for, in addition to displaying the current view on the display, also displaying the view associated with the view request on the display. For that purpose, the cache controller or the cache may inform the image client that the view is cached in the cache. The view may be displayed next to the current view, e.g., as a thumbnail. Hence, the user is informed about views that were predicted by the cache controller, and that may be of relevance to the user.

In general, the cache controller may be employed in a distributed application. Distributed applications play an important role in many domains, including healthcare. Here, the image client may be an image-based web application that obtains a rendered two-dimensional view of a three-dimensional volume from an image server to reduce the amount of transmitted image information to a minimum. The reason for this is that it is only necessary to transmit what is actually visible to the user. However, interaction with three-dimensional medical images suffers from a major drawback, as many interactions require a newly rendered view from the server and introduce latency, especially when using low-bandwidth connections for communicating with the image server. Hence, the cache controller may be used to reduce latency in such a distributed application.

Figure 7:
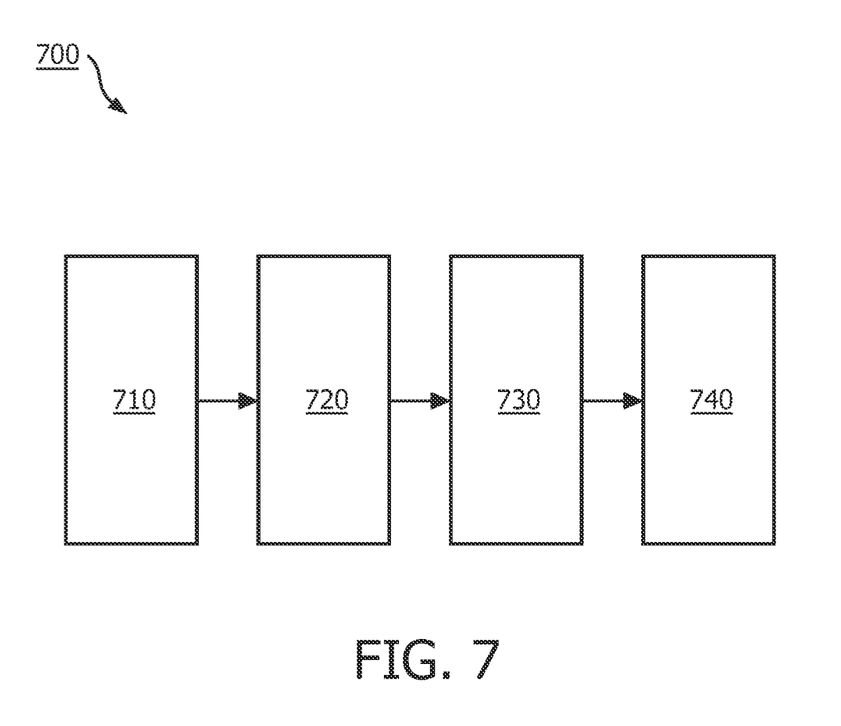
FIG. 7 shows a method of caching a view.

FIG. 7 shows a method of caching 700 for use in a system comprising an image client and an image server, the image client enabling a user to navigate through image data having at least three spatial dimensions by displaying views of the image data that are obtained from the image server in dependence on navigation requests of the user, and the method comprising obtaining 710 content data indicative of a content shown in a current view of the image client, the current view representing a first viewpoint in the three spatial dimensions of the image data, predicting 720 a view request of the image client in dependence on the content data, the view request corresponding to a view representing a second viewpoint in the three spatial dimensions of the image data, obtaining 730 the view from the image server in dependence on the view request, and caching 740 the view in a cache.

It will be appreciated that the invention also applies to computer programs, particularly computer programs on or in a carrier, adapted to put the invention into practice. The program may be in the form of a source code, an object code, a code intermediate source and object code, such as in a partially compiled form, or in any other form suitable for use in the implementation of the method according to the invention. It will also be appreciated that such a program may have many different architectural designs. For example, a program code implementing the functionality of the method or system according to the invention may be sub-divided into one or more sub-routines. Many different ways of distributing the functionality among these sub-routines will be apparent to the skilled person. The sub-routines may be stored together in one executable file to form a self-contained program. Such an executable file may comprise computer-executable instructions, for example, processor instructions and/or interpreter instructions (e.g. Java interpreter instructions). Alternatively, one or more or all of the sub-routines may be stored in at least one external library file and linked with a main program either statically or dynamically, e.g. at run-time. The main program contains at least one call to at least one of the sub-routines. The sub-routines may also comprise function calls to each other. An embodiment relating to a computer program product comprises computer-executable instructions corresponding to each processing step of at least one of the methods set forth herein. These instructions may be sub-divided into sub-routines and/or stored in one or more files that may be linked statically or dynamically. Another embodiment relating to a computer program product comprises computer-executable instructions corresponding to each means of at least one of the systems and/or products set forth herein. These instructions may be sub-divided into sub-routines and/or stored in one or more files that may be linked statically or dynamically.

The carrier of a computer program may be any entity or device capable of carrying the program. For example, the carrier may include a storage medium, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or to be used in the performance of, the relevant method.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A cache controller for use in a system comprising an image client and an image server, the image client enabling a user to navigate through image data having at least three spatial dimensions by displaying views of the image data that are obtained from the image server in dependence on navigation requests of the user, and the cache controller comprising:
 a hardware processor configured to obtain content data indicative of a content shown in a current view of the image client, the current view representing a first viewpoint in the three spatial dimensions of the image data, wherein the image data is one of X-ray Imaging, Computed Tomography (CT), Magnetic Resonance Imaging (MRI), Ultrasound (US), Positron Emission Tomography (PET), or Single Photon Emission Computed Tomography (SPECT) image data;
 the hardware processor being further configured to perform an image analysis of the current view for obtaining an object within the current view;
 the hardware processor being further configured to predict a view request of the image client in dependence on the object, the view request corresponding to a view representing a second viewpoint in the three spatial dimensions of the image data; and
 a hardware device to obtain the view from the image server in dependence on the view request, and for caching the view in a cache.

2. The cache controller according to claim 1, wherein the hardware processor predicts a semantic interpretation of the object.

3. The cache controller according to claim 1, wherein the content shown in a current view is an image of anatomical tissue, and the object is a sub-set of the anatomical tissue.

4. The cache controller according to claim 1, wherein the hardware processor is configured to predict the view request by:
 obtaining an orientation of the object within the current view; and
 predicting a request associated with an adjacent view adjacent to the current view along the orientation of the object, for predicting the view request.

5. The cache controller according to claim 1, wherein the hardware processor is configured to obtain metadata comprising the content data from the image server.

6. The cache controller according to claim 1, wherein the hardware processor is configured to obtain metadata indicative of image content of the image data from the image server, the image content comprising the content, and the hardware processor being configured to obtain the content data from the metadata by:
 obtaining position data indicative of a position of the first viewpoint in the three spatial dimensions of the image data; and
 selecting a portion of the metadata in dependence on the position data for obtaining as the content data the portion of the metadata being indicative of the content.

7. The cache controller according to claim 1, wherein the hardware processor is configured to obtain user history data indicative of previous use of the image client, and the hardware processor is configured to predict the view request in dependence on the content data and on the user history data.

8. The cache controller according to claim 1, wherein the cache controller is part of an image client.

9. The cache controller according to claim 1, wherein the cache controller is part of an image server.

10. The cache controller according to claim 9, wherein the hardware processor is configured to obtain the content data by performing an image analysis of the image data.

11. The cache controller according to claim 9, wherein the cache is part of an image client and the hardware device is configured to cache the view in the cache of the image client.

12. The cache controller according to claim 1, wherein the cache controller is part of a workstation.

13. The cache controller according to claim 1, wherein the cache controller is part of an imaging apparatus.

14. The cache controller according to claim 1, wherein the content includes luminance values of a group of pixels.

15. The cache controller according to claim 1, wherein the content includes a data element identifying the object.

16. The cache controller according to claim 1, wherein the processor predicts the view request based on a current position and an orientation of the object in the current view.

17. The cache controller according to claim 1, wherein the processor predicts the view request based on a location of a detected nearby object.

18. The cache controller according to claim 1, wherein the processor predicts the view request based on a geometrical extrapolation of an orientation of the object, which is partially present in the current view.

19. A method of caching, for use in a system comprising an image client and an image server, the image client enabling a user to navigate through image data having at least three spatial dimensions by displaying views of the image data that are obtained from the image server in dependence on navigation requests of the user, and the method comprising:
 obtaining, by a processor, content data indicative of a content shown in a current view of the image client, the current view representing a first viewpoint in the three spatial dimensions of the image data, wherein the image data is medical image data generated by a medical imaging scanner;

performing, by the processor, an image analysis of the current view for obtaining an object within the current view, wherein the object is an anatomical tissue of interest;

predicting, by the processor, a view request of the image client in dependence on the object, the view request corresponding to a view representing a second viewpoint in the three spatial dimensions of the image data;

obtaining, by the processor, the view from the image server in dependence on the view request; and caching, by the processor, the view in a cache.

20. A non-transitory computer readable medium encoded with a computer program product comprising instructions for causing a processor system to perform a method of caching, for use in a system comprising an image client and an image server, the image client enabling a user to navigate through image data having at least three spatial dimensions by displaying views of the image data that are obtained from the image server in dependence on navigation requests of the user, and the method comprising:

obtain content data indicative of a content shown in a current view of an image client, the current view representing a first viewpoint in a three spatial dimensions of image data, wherein the image data is diagnostic image data generated by a diagnostic imaging system;

perform an image analysis of the current view for obtaining an object within the current view;

predict a view request of the image client in dependence on the object, the view request corresponding to a view representing a second viewpoint in the three spatial dimensions of the image data;

obtain the view from an image server in dependence on the view request; and cache the view in a cache.

* * * * *